United States Patent [19]

Gunmar

[11] Patent Number: 5,448,599
[45] Date of Patent: Sep. 5, 1995

[54] METHOD AND ARRANGEMENT FOR RADIOCOMMUNICATION USING A BAND-SPREADING TECHNIQUE

[75] Inventor: Krister Gunmar, Trangsund, Sweden

[73] Assignee: Televerket, Farsta, Sweden

[21] Appl. No.: 185,967

[22] Filed: Feb. 9, 1994

[30] Foreign Application Priority Data

Jul. 9, 1992 [SE] Sweden .................................. 9202126

[51] Int. Cl.$^6$ ............................................. H04B 1/69
[52] U.S. Cl. ..................................... 375/200; 380/34
[58] Field of Search ................. 375/1; 380/34, 46, 49

[56] References Cited

U.S. PATENT DOCUMENTS

| 4,010,465 | 3/1977 | Dodington et al. | 375/1 |
|---|---|---|---|
| 5,056,106 | 8/1991 | Wang et al. | |
| 5,241,562 | 8/1993 | Partyka et al. | 375/1 |
| 5,335,249 | 8/1994 | Krueger et al. | 375/1 |

FOREIGN PATENT DOCUMENTS 0389972  3/1991  European Pat. Off. .

OTHER PUBLICATIONS

IEEE Transactions on Communications, vol. Com32, No. 7, Jul. 1984, K. Yamada et al., "Performance of Portable Radio Telephone Using Spread Spectrum" pp. 762-768.

*Primary Examiner*—David C. Cain
*Attorney, Agent, or Firm*—Oblon, Spivak, McClelland, Maier & Neustadt

[57] ABSTRACT

The invention relates to a method and an arrangement for radiocommunication between a transmitter and a receiver, especially transmission of information between mobile units and/or fixed units in connection with monitoring and controlling traffic. A problem with this type of communication arises when a single wave is reflected from the roadway or ground and this wave is of approximately the same strength as the direct wave between transmitter and receiver. According to the invention, the problem is overcome by using communication at high frequencies, the GHz range, and using a spread-spectrum technique. By utilizing a spread-spectrum technique, the relative distance and relative speed between transmitter and receiver can also be calculated by simple means, which is a special advantage in this application (FIG. 2 a).

9 Claims, 1 Drawing Sheet

AUTOCORRELATION FOR
A PN SEQUENCE OF LENGTH N

[5,448,599]

METHOD AND ARRANGEMENT FOR RADIOCOMMUNICATION USING A BAND-SPREADING TECHNIQUE

FIELD OF THE INVENTION

The present invention relates to a radio-communication system for transmitting information between mobile units and/or fixed units in connection with monitoring and controlling traffic.

PRIOR ART

There is a need to provide good communication from car to car or car to fixed cell in future traffic regulation systems. In this case, the transmission reliability of the data information is of the greatest significance.

There are situations when it is extremely difficult to ensure the quality of the information transmission by means of a narrow-band technique. The matter is evident if curves of the received power as a function of the distance from the transmitter are studied. These so-called propagation curves depend to a great extent on antenna heights, the nature of the surrounding terrain, electric ground characteristics and so forth. An especially difficult case arises when a single wave is reflected from the roadway and this wave is approximately of the same strength as the direct wave between transmitter and receiver. FIG. 1 shows a measured propagation curve for a measuring section on an airfield for this 2-beam situation. If a stationary vehicle attempts to communicate with a fixed cell, it is relatively likely that the vehicle is located at a minimum in the propagation curve, a so-called fading minimum. In the same way, two moving vehicles, which are driven with similar speed, can get into minima of the propagation curve when there is communication between them. The vehicles can be in this situation for a very long time. If communication takes place at high frequencies, the GHZ range, there are sufficient bandwidths for utilising a band spreading technique by means of which the fading problem can be overcome.

Examples of the utilisation of a spread-spectrum technique are given in patent specifications U.S. Pat. No. 4,761,796, U.S. Pat. No. 4,926,440, U.S. Pat. No. 4,862,478 and U.S. Pat. No. 4,903,279. In patent EP 357963, transmission of information between cars by means of infrared or microwave transmitters is described. In this patent the intent is that vehicles will maintain their location between themselves While driving in convoy.

A complete band spreading system of the simplest type is shown in FIG. 2. The signal A(t) represents the binary-modulated signal which contains the useful information which is to be transmitted. The PN sequence (pseudo-noise sequence of maximum-length type) is periodic and has a much greater bandwidth than A(t), which is the point of this type of communication system. The ratio between the bandwidths of the wide-band and narrow-band signal is called spread spectrum gain, which provides an approximate measure of the signal/noise ratio at the output of the receiver if the noise is a spread-spectrum signal but with an unsynchronised PN sequence, or other PN sequence, than that which is used at the receiver. If polarity reversals of the binary PN sequence are carried out, this corresponds to a binary phase modulation in which the phase angle is turned by 180°.

In studies of advanced road information systems with information exchange between cars and/or fixed cells, applications with ranges of around 100 m have been found to be usable.

OBJECT OF THE INVENTION

The object of the present invention is to create a good communication channel free from the influence of ground reflections and other reflections. Carrier wave frequencies in the GHz range with low transmitter powers are also used for avoiding harmful effects on people. Fading occurs in communication between moving vehicles. In particular, a loss of signal can occur for a relatively long time if the communicating vehicles are driven at the same speed. In traffic monitoring and traffic control it is also important where different vehicles are located with respect to one another and that there is a need for being able to measure their mutual distance and speed. The present invention indicates a method and an arrangement for solving the problems described above.

SUMMARY OF THE INVENTION

The invention is specified in greater detail in the patent claims following.

DESCRIPTION OF A PREFERRED EMBODIMENT

Figure 1:
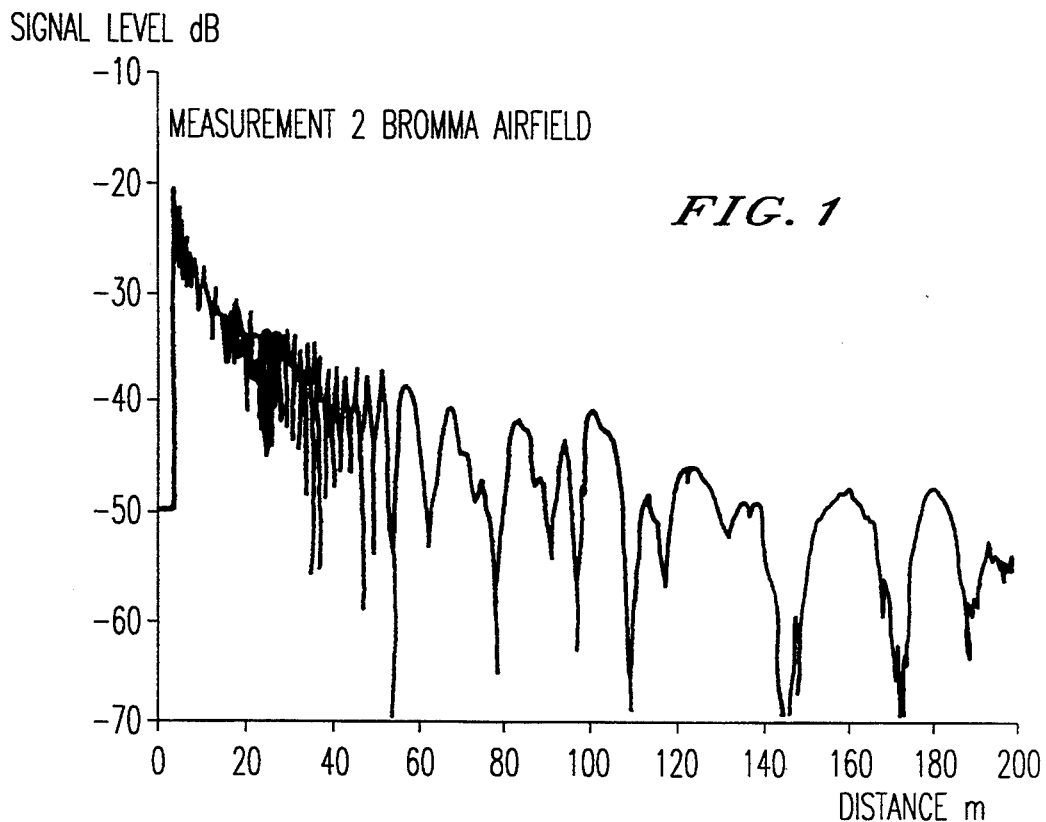
FIG. 1 shows the received power measured at different distances from a transmitter.
Figure 2A:
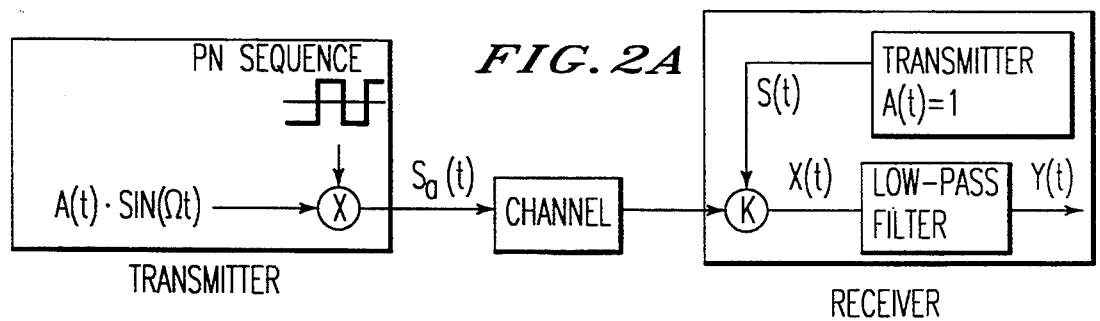
FIG. 2A shows a spread-spectrum system with transmitter and receiver.
Figure 2B:
FIG. 2b shows the waveform $S_a(t)$ in the channel.

In the text which follows, a system with mobile units and fixed units is described. This system is used for transmitting information between mobile units or a fixed unit and a mobile unit. The information is utilised as information and for controlling the mobile units. For example, the route of the vehicles can be changed with respect to the traffic situation or information can be given about suitable driving speed, road characteristics and so forth.

Mobile units, moving or standing still, exchange information with one another and/or with fixed units along the route. The transmitted information is transmitted by radio frequencies in the GHz range. In the subsequent description, a carrier wave with a frequency of 60 GHz is used. The binary clock is 1–6 Gbit/s for the PN sequence. The phase shift does not need to be carried out exactly at the zero crossings of the carrier wave. The system uses low power (1 mW–1 W, preferably around 1 mW) entailing a short range. This reduces the disadvantage of the spectrum having a large extent. The useful signal A(t) is heterodyned by further phase modulation. The spreadsspectrum gained is produced by a plurality of periods of the PN sequence being accommodated between each phase shift depending on the useful signal.

The following assumptions apply in the following example:

| | |
|---|---|
| Bit frequency | 3 GHz |
| PN sequence period | 4092 |

| | |
|---|---|
| Information clock | 300 kbit/s |
| Transmitter power | 1 mW |

The binary phase-modulated signal is sinusoidal with the exception of short time intervals at the phase shifts which is why the transmitter output stage, in contrast to the RF stages in the receiver, do not need to be linear. The output stage has been made to have such a wide bandwidth that the transient characteristic of the output stage is much shorter than the duration of one bit.

The receiver is linear with a dynamic range of at least 40 dB. This approximately corresponds to the difference in signal level between a transmitting vehicle close by and a transmitting vehicle at the limit of the range. The receiver basically consists of a multiplying circuit with two inputs and a low-pass filter with a time constant approximately corresponding to the time for a number of complete PN sequences. This corresponds to a time constant of 2–3 microseconds. The received spread-spectrum signal is supplied to one input of the multiplier and a spread-spectrum signal A(t)=1, unmodulated with respect to information and internally generated, is supplied to the second input. Using formulae, this is described as follows:

| | |
|---|---|
| X(t) | signal before the low-pass filter |
| Y(t) | signal after the low-pass filter |
| A(t) | modulating signal |
| p(t) | PN sequence |
| sin(ωt) | carrier wave |
| $X(t)=S_a(t) \cdot S(t) \cdot e^{i\phi}$ | | where $S_a(t)=A(t) \cdot P(t) \cdot sin(\omega t)$ and $S(t)=P(t+\tau) \cdot sin(\omega t)$ The channel has been defined as a pure phase rotation with the angle $\phi$.

The product of the two spread-spectrum signals contains the factor $sin(\omega t) \cdot sin(\omega t + \phi)$.

The low-pass filtering is adapted so that the high-frequency component disappears, the resulting signal after filtering being $$Y(t) = 1/T \, A(t) \cdot \left( \int_O^T P(x) \cdot P(x + \tau) dx \right) cos(\phi)/2$$

The modulating signal A(t) varies slowly compared with P(t). T is selected so that Y(t) varies as the information signal A(t) multiplied by an integral representing the autocorrelation for the PN sequence multiplied by a further factor which is dependent on the phase relationship between the received spread-spectrum signal and the spread-spectrum signal generated internally in the receiver, that is to say $$Y(t) = A(t) \cdot R(\tau) \cdot cos(\phi)/2$$

Figure 3:
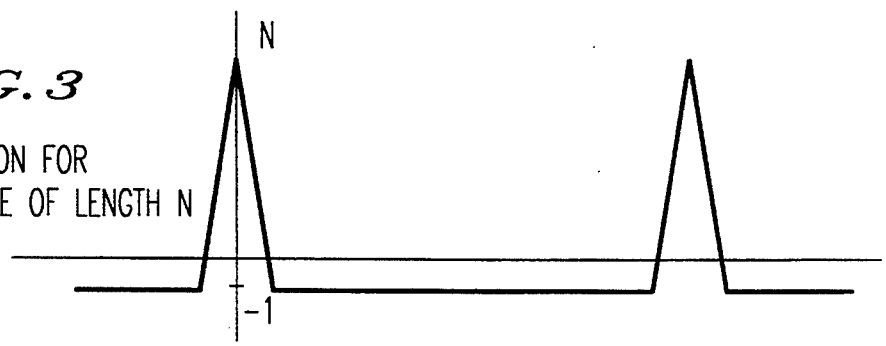
FIG. 3 diagrammatically shows the autocorrelation for a PN sequence of length N.

$R(\tau)$ is the autocorrelation for the PN sequence. A diagrammatic curve of the autocorrelation is shown in FIG. 3. For a channel with a number of reflected waves having the amplitude $a_i$, a superposition is used, in which $$Y(t) = A(t) \cdot \Sigma a_i \cdot R(\tau_i) \cdot cos(\phi_i)/2$$

With N=4092, the correlation gain (spread-spectrum gain) becomes about 36 dB at the extreme values N and −1 of the correlation. A synchronisation error of half a bit length corresponds to 6 dB reduction from 36 dB to 30 dB in suppression of an interfering spread-spectrum signal. A synchronisation error of three-quarters of a bit provides a suppression of 24 dB and so forth.

If the information sequence on the PN sequence is depicted in such a manner that an information bit corresponds to exactly N bits in the PN sequence, the correlation gain is calculated as the ratio between the bandwidths of the spread-band base band signal and the base band signal.

There has to be synchronism between the received and the internally generated spread-spectrum signal before reception with an amplification corresponding to the spread-spectrum gain can take place. It is taken into account that a doppler shift occurs as a result of transmitter and receiver moving relative to one another. Vehicles which move relative to one another with a difference in speed of 30 m/s have a doppler shift of 6000 Hz at 60 GHz. With a bit frequency of 3 GHz, 20 Hz are included per bit which corresponds to 300 bit/s at 6000 Hz. So that the sequences slide with respect to one another to the least possible extent, the carrier wave frequency is corrected by 6000 Hz for the internally generated spread-spectrum signal. After measuring the doppler shift and correction for this, synchronisation takes place by the internally generated signal being phase-locked to the received signal and the internally generated PN sequence being stepped up approximately one tenth bit at a time until its maximum correlation is obtained. This position is found within a frame of maximum 160 megabits (approximately 50 ms) provided that otherwise favourable conditions prevail.

The doppler shift is calculated in different ways, for example with the aid of a transmitted pilot tone from the transmitter, the doppler-shifted pilot tone being multiplied by a reference tone in the receiver and the difference tone being filtered out.

It is also possible to calculate the doppler shift directly from the spread-spectrum signal by squaring and narrow-band filtering and thereafter comparing with a reference tone in the receiver in the same way as in the application of the pilot tone above.

An alternative is a synchronisation circuit which, apart from looking for the bit position, also looks for the doppler frequency.

The ground-reflected wave is delayed relative to the direct wave. When the communication link (R) is significantly greater than the sum of the antenna heights $h_1$ and, respectively, $h_2$, the delay is $$D = 2 \cdot h_1 \cdot h_2 / R$$

To correlate out all ground-reflected waves with a distance R and antenna heights $h_1$ and, respectively, $h_2$, the bit length must be shorter than D converted into wave propagation time. Assuming R=50 and $h_1=h_2=1.5$ m, D=0.09 m. This delay in the link corresponds to an extra cycle time of the reflected wave of 0.3 ns. This extra cycle time corresponds to a bit frequency of 3 Gbit/s.

The case described with low antenna heights makes up a worst case with respect to mirror reflections on the ground with short delay. With the conditions assumed above it is not possible to increase the bit clock to a significant extent above 3 Gbit/s, since the effective useful bandwidths should be limited to 6 GHz at the carrier wave frequency of 60 GHz. A range of 50 m is obtained without influence of ground reflections. In the time it takes to pass through this range zone, a high-quality channel is obtained with allows a bit speed of 300 kbit/s. To obtain low bit error probabilities, the bit stream can be coded. Convolution codes can be advantageously used since error bursts do not occur to any large extent.

In the description above, the "ground-reflection-free" range is 50 m while the depth of fading is limited far outside this limit. For example, it holds true that the depth of fading is 6 dB at 100 m and 12 dB at 200 m since the correlation gain is linearly dependent on the time offset within the length of the bit length. Control of the expected depth of fading is obtained even though the antifading effect is not obtained to the full extent. A maximum degree of fading of 12 dB at the range limit is not disadvantageous. Accepting 18 dB at 200 m, the bit speed of 1.5 GHz can be utilised which entails an RF bandwidth of 3 GHz.

In certain situations, reflections are obtained with short delay from other vehicles. For example, a situation of this type arises in communication with vehicles which are in front when overtaking. However, the depth of fading is maximised due to the spread-spectrum signal.

Thus, a number of vehicle pairs can communicate with one another with the same PN sequence within the same frequency band. The probability that two pairs of cars synchronise with the same bit phase position is approximately 0.25 per thousand for PN sequences with a length of 4092 if no other vehicle pairs are communicating. However, it is only possible for a relatively low number of vehicles to be located within the range zone. Vehicles close to one another can identify each other by determining the distance to the vehicle from which signals are received. The probability of interference between a pair of vehicles is lowered further by a plurality of different PN sequences being used and the receiver testing these in turn on initial synchronisation. These codes can be considered as channels like spectral channels or TDMA channels.

The distance between vehicles or between a vehicle and fixed transmitter/receiver can be calculated in different ways.

A vehicle sends out a sequence which is received by the receiver (mobile or fixed station) which retransmits the PN sequence in the bit position in which it was synchronised on reception. The vehicle thereafter determines the distance by comparison of the transmitted and received bit position.

A passive reflector can also be used and is in this case mounted on the vehicle the distance of which is to be determined, the transmitter and receiver antennas on a distance-measuring vehicle having to be electromagnetically well insulated from one another. At a distance of 200 m, the path of propagation there and back is 400 m corresponding to a propagation time of 1.32 microseconds. This corresponds to 4000 bits in the embodiment preferred here. Since the PN sequence has a period of 4092 bits, only distances shorter than 200 m can be measured unambiguously.

The determination of the relative speed between vehicles is carried out, for example, by repeated distance determinations or by using information in the doppler shift which is determined at the instant of synchronisation.

The expert will easily recognise that the invention described above can be modified in different ways. The invention is only limited by the following patent claims.

I claim:

1. An system for radio communication comprising:
   a transmitter operating in the GHz range and transmitting a signal inputted thereto in a spread-spectrum manner using a plurality of periods of a PN sequence;
   a receiver comprised of
      a receiving circuit;
      a multiplying circuit having two inputs;
      a low-pass filter having a time constant approximately equal to a time corresponding to the time needed for a number of complete PN sequences of said transmitter, wherein the receiver supplies at one input of said multiplying circuit and a spread-spectrum signal internally generated at said receiver is supplied to the other input of said multiplying circuit and wherein the output of said multiplying circuit is supplied to said low-pass filter.

2. A system as in claim 1 wherein said transmitter has a fixed location.

3. A system as in claim 1 wherein said transmitter is mobile.

4. A system as in claim 1 wherein said receiver has a fixed location.

5. A system as in claim 1 wherein said receiver is mobile.

6. A system as in claim 2, 3, 4 or 5 wherein said transmitter further comprises:
   means for determining the distance between said transmitter and said receiver.

7. A system as in claim 6 further comprising:
   passive reflectors at both said transmitter and said receiver.

8. A system as in claim 7 further comprising:
   means to determine the relative speed of motion between said transmitter and said receiver.

9. A system as in claim 8 further comprising:
   means to calculate any Doppler shift in the transmitted signal between said transmitter and said receiver.

* * * * *

UNITED STATES PATENT AND TRADEMARK OFFICE
CERTIFICATE OF CORRECTION

PATENT NO. : 5,448,599
DATED      : September 5, 1995
INVENTOR(S): Krister GUNMAR, et al.

It is certified that error appears in the above-indentified patent and that said Letters Patent is hereby corrected as shown below:

On the title page, should read items:

--[22]  PCT Filed: Jun. 24, 1993

[86]  PCT No:    PCT/SE93/00573

[87]  PCT Pub. No.: WO94/01938

PCT Pub. Date: Jan. 20, 1994--

Signed and Sealed this

Fourteenth Day of November, 1995

Attest:

BRUCE LEHMAN

*Attesting Officer*         *Commissioner of Patents and Trademarks*